United States Patent Office 3,764,376
Patented Oct. 9, 1973

3,764,376
ANTISTATIC RESINOUS COMPOSITIONS
John Duncan Wagner, Chester, England, and Hans-Werner Friedrich Michael Finck, Wedel, Holstein, Germany, assignors to Lever Brothers Company, New York, N.Y.
No Drawing. Original application May 28, 1969, Ser. No. 830,217, now Patent No. 3,574,156. Divided and this application Oct. 19, 1970, Ser. No. 82,059
Claims priority, application Great Britain, May 31, 1968, 26,130/68
Int. Cl. B32b *27/06;* C09k *3/16*
U.S. Cl. 117—138.8 E  4 Claims

ABSTRACT OF THE DISCLOSURE

The invention relates to the use of fatty acid glycerides containing at least 50% by weight, preferably at least 80% by weight of a saturated linear $C_6$–$C_{10}$ monoglyceride for reducing the surface electrical resistance of thermoplastic polymers such as polyethylene, polypropylene, polyvinylchloride and polystyrene. Resinous compositions possessing improved antistatic properties and comprising 0.05–7% by weight $C_6$–$C_{10}$ monoglyceride and processes for preparing these compositions are provided.

---

This is a divisional application of Ser. No. 830,217 filed May 28, 1969, now U. S. Pat. No. 3,574,156.

This invention relates to resinous compositions possessing antistatic properties and in particular to the use of a particular class of monoglycerides with certain thermoplastic polymers as a means for reducing their high electrical surface resistance.

Static charge can accumulate on the surface of sheets, fibres or moulded articles that are manufactured from thermoplastic polymers for various reasons, such as contact of these polymers with extrusion dies, rollers or other surfaces. Because of the high electrical surface resistance of these sheets, fibres or moulded articles it is difficult to conduct away any static charge that is present on their surface. As a result static charge tends to accumulate giving rise to certain difficulties of processing and certain deleterious effects in the final processed article, the most common of which is dust pick-up, which can make articles displayed for sale much less attractive.

Various organic compounds are known to possess useful antistatic properties. These properties cause the compound, when blended with a thermoplastic polymer or applied to the surface of an article moulded from a thermoplastic polymer, to reduce the electrical surface resistance and hence accelerate the dissipation of the static charge to earth. The reduction in electrical surface resistance brought about by the addition of these compounds will be referred to in this specification as an antistatic effect.

Certain classes of compounds, such as the 1-hydroxyethyl-2-long chain alkylimidazolines, the N,N-(dihydroxyethyl) long chain alkylamines and the long chain alkyldiethanolamides possess good antistatic properties but could be objected to on the grounds of possible toxicity. The monoglycerides of $C_{12}$ and $C_{18}$ saturated acids are also known antistatic agents which are non-toxic in character and which in some countries, are acceptable as direct additives in foodstuffs. They do not, however, possess outstandingly good antistatic properties.

It has now been found that $C_6$–$C_{10}$ saturated fatty acid monoglycerides in relatively pure form possess a surprisingly superior antistatic effect over the $C_{12}$ and $C_{18}$ saturated monoglycerides. Moreover, they are resistant to oxidation and do not cause tainting through the development of rancidity.

Accordingly, this invention provides a resinous composition comprising a thermoplastic polymer having a basic unit of the general formula $$-(CH_2-CHR^1)-$$

wherein $R^1$ represents hydrogen, a methyl group, a phenyl group, a substituted phenyl group or a halide radical and a fatty acid glyceride containing at least 50% by weight of a saturated linear $C_6$–$C_{10}$ fatty acid monoglyceride in an amount equal to 0.05–7% by weight of the resinous composition calculated as 100% pure $C_6$–$C_{10}$ saturated linear fatty acid monoglyceride. Preferably the saturated fatty acid glyceride will contain at least 80% by weight of the saturated linear $C_6$–$C_{10}$ fatty acid monoglyceride.

The invention further provides a process for the preparation of the resinous composition which comprises intimately blending the thermoplastic polymer with a fatty acid glyceride containing at least 50% by weight of a saturated linear $C_6$–$C_{10}$ monoglyceride (hereinafter referred to as a $C_6$–$C_{10}$ monoglyceride) in an amount equal to 0.05–7% by weight of the resinous composition (calculated as 100% pure material). In another aspect, the invention also provides a process for the preparation of an article, moulded from the thermoplastic polymer, which contains as its outer layer, a resinous composition comprising the $C_6$–$C_{10}$ monoglyceride and thermoplastic polymer which comprises treating the surface of the moulded article with the $C_6$–$C_{10}$ monoglyceride.

The $C_6$–$C_{10}$ monoglyceride that is to be used with the thermoplastic polymer should preferably have a purity of at least 80%, particularly more than 90%. The impurities in such a material are free glycerol, soap and $C_6$–$C_{10}$ di- and tri-glycerides.

The $C_6$–$C_{10}$ monoglycerides can be prepared by heating caproic acid, oenanthic acid, octoic acid, pelargonic acid, decanoic acid or a mixture of these fatty acids with at least 1 mole of glycerol under an inert atmosphere (usually nitrogen) until the acid value of the reaction mixture falls below 4. A preferred glyceride is that prepared from a mixture of octoic and decanoic acids.

This reaction is more readily achieved in the presence of an acid or an alkaline catalyst. Preferably, the catalyst is an alkaline catalyst such as anhydrous sodium carbonate or sodium hydroxide. The $C_6$–$C_{10}$ monoglyceride can be isolated in a form having a purity of at least 80% by vacuum distillation under conditions where excessive exposure to high temperature is avoided.

It is possible to prepare 100% pure $C_6$–$C_{10}$ monoglyceride by reacting an appropriate $C_6$–$C_{10}$ saturated linear fatty acid with a stoichiometric excess of isopropylidene glycerol in benzene solution and in the presence of p:toluene sulphonic acid as catalyst. Subsequent to this esterification reaction the isopropylidene group is removed by the action of concentrated hydrochloric acid at $-25°$ C.

The amount of $C_6$–$C_{10}$ monoglyceride, calculated as 100% pure material, that can confer a useful antistatic effect on the thermoplastic polymer varies from 0.5–7% by weight of the resinous composition. A preferred range is 0.1–2.5% by weight of the resinous composition.

Thermoplastic polymers that can form the basis of the resinous compositions include polypropylene, copolymers of ethylene and propylene, polystyrene, polyvinyl chloride and, preferably, low density polyethylene and high density polyethylene. Any blend of such thermoplastic polymers can also be used. The antistatic effect that is obtained by incorporating the $C_6$–$C_{10}$ monoglyceride into low density polyethylene is significantly greater than that shown by the $C_{12}$ and $C_{18}$ saturated monoglycerides.

To produce a desired antistatic effect, the requisite amount of the $C_6$–$C_{10}$ monoglycerides, together with other additives such as a titanium dioxide filler, can be intimately blended with a thermoplastic polymer in a Banbury mixer, or on heated rollers or in any other high temperature, powerful mixing device. The temperature of blending depends on the type of thermoplastic polymer used and generally varies between 100 and 180° C. The resinous composition that is produced can be further processed as required.

It is possible to prepare resinous compositions which contain up to 7% w./w. $C_6$–$C_{10}$ monoglyceride which are of value as "master batches." The use of these "master batches" can facilitate the production of resinous compositions comprising a standard amount of the $C_6$–$C_{10}$ monoglyceride. The compatibility of the $C_6$–$C_{10}$ monoglyceride and the thermoplastic polymer is such that resinous compositions containing more than 7% w./w. $C_6$–$C_{10}$ monoglyceride tend to be unstable.

The $C_6$–$C_{10}$ monoglycerides are stable at blending temperatures of 100°–180° C. and do not decompose into toxic materials.

The desired antistatic effect can also be conferred onto articles or sheets that are obtained by extrusion, by injection moulding or calendering of thermoplastic polymers by suitable treatment of the surfaces of these articles with a $C_6$–$C_{10}$ monoglyceride. This treatment is conveniently effected by treating a moulded polyvinyl chloride, polystyrene, polyethylene or polypropylene article or sheet with a solution or dispersion of the $C_6$–$C_{10}$ monoglyceride (in a diluent, such as water, methyl alcohol or ethyl alcohol) that has substantially no effect on the surface of the moulded article. The thus treated moulded article is subsequently dried at a suitable temperature.

The antistatic effect is observed by measuring the electrical surface resistance of a test sample of the thermoplastic polymer containing the $C_6$–$C_{10}$ monoglyceride which has been conditioned for 24 hours at 20° C. and 65% R.H. to prevent fluctuation of readings due to prevailing atmospheric conditions. The conditioned sample is placed between two parallel metal electrodes mounted in a humidity-controlled cabinet and the surface resistance measured at 500 v. for 1 minute by the method set out in DIN specification 53482. To obtain consistent readings it is necessary to ensure that the electrodes make an even contact with all the area of the test sample.

The invention will be further described with reference to the following examples.

EXAMPLE 1

A sample of 100% pure glycerol mono-octoate was prepared from the reaction between 1 mole pure octanoic acid and 3 mole isopropylidene glycerol in the presence of 0.14 mole p:toluene sulphonic acid, the isopropylidene group subsequently being removed by the reaction of concentrated hydrochloric acid at −25° C. The glycerol mono-octoate was crystallized at 0° C. from petroleum ether (B.P. 40–60° C.).

A resinous composition was prepared by milling 99 parts by weight of low density polyethylene granules and 1 part by weight of the pure glycerol mono-octoate on heated rollers at 120° C. The resultant resinous composition was formed into sheets by suitable moulding at 120° C. Duplicate test samples of these sheets were taken and conditioned at 45% R.H. for 24 hours. Their electrical surface resistance was measured and shown to be $3.6 \times 10^9$ ohms.

EXAMPLE 2

Samples of glyceryl mono-caproate, glyceryl mono-oenanthate, glyceryl mono-pelargonate and glyceryl mono-octoate-decoate having a purity higher than 90% were prepared by reacting glycerol with the appropriate fatty acid and subsequently passing the reaction product through a standard type of molecular still. A resinous composition comprising high density polyethylene (PE) and 1% w./w. of these monoglycerides was tested by the method described in Example 1. The data obtained is tabulated below, together with the data obtained from tests on sheets of the high density polyethylene containing no monoglyceride. (Control sample.)

TABLE 1

| Monoglyceride | Surface Percent content in sample | Resistance 1% in PE (ohms) |
|---|---|---|
| (Control sample) | | $1 \times 10^{14}$ |
| Glyceryl monosterate | 90 | $1 \times 10^{11}$ |
| Glyceryl monocaproate | 94 | $3 \times 10^{10}$ |
| Glyceryl mono-oenanthate | 93 | $3 \times 10^{9}$ |
| Glyceryl mono-pelargonate | 93 | $5 \times 10^{9}$ |
| Glyceryl mono-octoate/decanoate | 94 | $5 \times 10^{9}$ |

EXAMPLE 3

Samples of high density polyethylene sheet containing varying quantities of glyceryl mono-octoate/decanoate (94% purity) were prepared by the method described in Example 1. The electrical surface resistance of the treated sheet was determined as follows.

TABLE 2

| Addition in percent: | Surface resistance in ohms |
|---|---|
| 2.5 | $6 \times 10^{8}$ |
| 1 | $5 \times 10^{9}$ |
| 0.5 | $1 \times 10^{10}$ |
| 0.25 | $6 \times 10^{9}$ |
| 0.1 | $6 \times 10^{9}$ |
| 0 | $1 \times 10^{14}$ |

EXAMPLE 4

Samples of polypropylene sheet containing varying quantities of 94% pure glyceryl mono-octoate/decoanoate were prepared by the method described in Example 1. The electrical surface resistance of the treated sheet was determined as follows.

TABLE 3

| Addition in percent: | Surface resistance in ohms |
|---|---|
| 2.5 | $3 \times 10^{10}$ |
| 1 | $1 \times 10^{11}$ |
| 0.5 | $3 \times 10^{11}$ |
| 0 | $1 \times 10^{12}$ |

EXAMPLE 5

Three ethanolic solutions containing respectively 0.05%, 0.1% and 0.5% by weight glyceryl mono-octoate/decanoate (94% purity) were prepared. A sheet of polyvinyl chloride (PVC), a sheet of polyethylene (PE) and a sheet of polystyrene (PS) was dipped into each of these solutions and dried at abount 65° C. The electrical surface resistance of each of these treated sheets was determined as follows.

TABLE 4

| Concentration in alcoholic solution | Surface resistance in ohms | | |
|---|---|---|---|
| | PVC | PE | PS |
| Glyceryl mono-octoate/decanoate: | | | |
| 0.5% | $8 \times 10^{8}$ | $4 \times 10^{8}$ | $3 \times 10^{9}$ |
| 0.1% | $1 \times 10^{10}$ | | |
| 0.05% | $1 \times 10^{12}$ | | |
| 0% | $9 \times 10^{13}$ | $1 \times 10^{13}$ | $3 \times 10^{13}$ |

EXAMPLE 6

An aqueous dispersion containing 0.5% by weight glyceryl mono-octoate/decanoate (94% purity) was prepared. A sheet of polyvinyl chloride (PVC), a sheet of polyethylene (PE) and a sheet of polystyrene (PS) were dipped into this dispersion and subsequently dried at about 65° C. The electrical surface resistance of these treated sheets was determined as follows.

TABLE 5

| Concentration in aqueous emulsion | Surface resistance in ohms | | |
|---|---|---|---|
| | PVC | PE | PS |
| 0.5% $C_8$-$C_{10}$ monoglyceride | $5\times10^8$ | $3\times10^8$ | $6\times10^8$ |
| Blank value sample | $9\times10^{13}$ | $1\times10^{13}$ | $3\times10^{13}$ |

EXAMPLE 7

A sample of glyceryl mono-octoate/decanoate was prepared by reacting together 1 mole of glycerol and 1 mole of a mixture of octanoic and decanoic acid and blended with low density polyethylene (to an extent of 1% w./w.) without subsequent purification. The sample contained 45% w./w. glyceryl mono-octoate/decanoate. The electrical surface resistance of a sheet of the polyethylene which had been treated in this way was $3\times10^{10}$ ohms.

In comparison, the electrical surface resistance of a similar sample of low density polyethylene which had been blended with 1% w./w. glyceryl mono-octoate/decanoate (94% purity) was $5\times10^9$ ohms.

What is claimed is:
1. An article comprising:
   (A) a moulded, extruded or calendered thermoplastic polymer selected from the group consisting of
   (a) polypropylene,
   (b) a copolymer of ethylene and propylene,
   (c) polystyrene,
   (d) polyvinyl chloride,
   (e) low density polyethylene,
   (f) high density polyethylene and any blend thereof, and
   (B) a saturated linear $C_6$-$C_{10}$ monoglyceride outer layer on the surface of said polymer.
2. An article in accordance with claim 1 wherein said polymer is low density polyethylene.
3. An article in accordance with claim 1 wherein said monoglyceride is prepared from a mixture of octoic and decanoic acids.
4. An article moulded from a thermoplastic polymer selected from the group consisting of polyvinyl chloride, polystyrene, polyethylene and polypropylene, which has an outer layer of a resinous composition comprising said thermoplastic polymer and a saturated linear $C_6$-$C_{10}$ monoglyceride.

References Cited
UNITED STATES PATENTS

| | | | |
|---|---|---|---|
| 3,057,810 | 10/1962 | Quillet | 260—23 |
| 2,649,143 | 8/1953 | Simon et al. | 117—138.8 X |
| 2,627,901 | 2/1953 | Simon et al. | 117—138.8 X |
| 3,307,773 | 3/1967 | Kratzer et al. | 117—167 X |
| 3,279,943 | 10/1966 | Skeen et al. | 117—167 X |
| 3,470,095 | 9/1969 | Pontelandolfo | 117—139.5 |
| 3,503,880 | 3/1970 | McMicken | 117—139.5 X |
| 2,955,960 | 10/1960 | Batty et al. | 117—139.5 X |
| 2,207,229 | 7/1940 | Sherman | 117—139.5 X |

WILLIAM D. MARTIN, Primary Examiner

S. C. CHILDS, Assistant Examiner

U.S. Cl X.R.

117—138.8 UA, 139.5 F, 167; 260—23 H